US012613869B2

(12) United States Patent
Han et al.

(10) Patent No.: US 12,613,869 B2
(45) Date of Patent: Apr. 28, 2026

(54) METHOD, APPARATUS, ELECTRONIC DEVICE, AND MEDIUM FOR PROCESSING DATABASE QUERY

(71) Applicant: Beijing Volcano Engine Technology Co., Ltd., Beijing (CN)

(72) Inventors: Yuxing Han, Beijing (CN); Haoyu Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 11 days.

(21) Appl. No.: 18/971,533

(22) Filed: Dec. 6, 2024

(65) Prior Publication Data

US 2025/0225133 A1 Jul. 10, 2025

(30) Foreign Application Priority Data

Jan. 5, 2024 (CN) .......................... 202410022242.4

(51) Int. Cl.
*G06F 16/24* (2019.01)
*G06F 16/22* (2019.01)
*G06F 16/2455* (2019.01)

(52) U.S. Cl.
CPC ...... *G06F 16/24552* (2019.01); *G06F 16/221* (2019.01); *G06F 16/2255* (2019.01); *G06F 16/24556* (2019.01)

(58) Field of Classification Search
CPC .................................................. G06F 16/24552
USPC .......................................................... 707/713
See application file for complete search history.

(56) References Cited

U.S. PATENT DOCUMENTS

| 2015/0248467 | A1* | 9/2015 | Buteau ................ G06F 16/2453 |
| | | | 707/625 |
| 2021/0406717 | A1* | 12/2021 | Tauheed ................. G06N 20/10 |
| 2022/0114195 | A1* | 4/2022 | Ziauddin ............... G06F 16/285 |

FOREIGN PATENT DOCUMENTS

| EP | 4485271 A1 * | 1/2025 | ........... G06F 16/254 |
| JP | 2004078542 A * | 3/2004 | ......... G06F 17/2217 |

* cited by examiner

*Primary Examiner* — Syling Yen
(74) *Attorney, Agent, or Firm* — Alleman Hall LLP

(57) ABSTRACT

Embodiments of the present disclosure provide a method and apparatus for database query, an electronic device, and a medium. The method includes: determining, in response to receiving a structured query language (SQL) query for a database, a query condition and a target column of the SQL query that relates to a number of distinct values (NDV) estimation; selecting, from sampled data of the database, data of the target column that meets the query condition; generating feature data of the selected data of the target column; and determining an estimated NDV of the target column based on the feature data using a model for NDV estimation.

15 Claims, 6 Drawing Sheets

200

| Column#1 | Column #2 | Column#3 | Column#4 | Column#5 | Column#6 | Column #7 | Column#8 |
|---|---|---|---|---|---|---|---|
| 1 | 0101 | 1 | 77 | 77 | 95 | 75 | 97 |
| 1 | 0126 | 2 | 87 | 87 | 100 | 75 | 97 |
| 1 | 0114 | 3 | 77 | 60 | 95 | 75 | 93 |
|  | 0139 | 4 | 87 | 91 | 95 | 75 | 63 |

NDV value

| 1 | 4 | 4 | 2 | 4 | 2 | 1 | 3 |
|---|---|---|---|---|---|---|---|

202

204

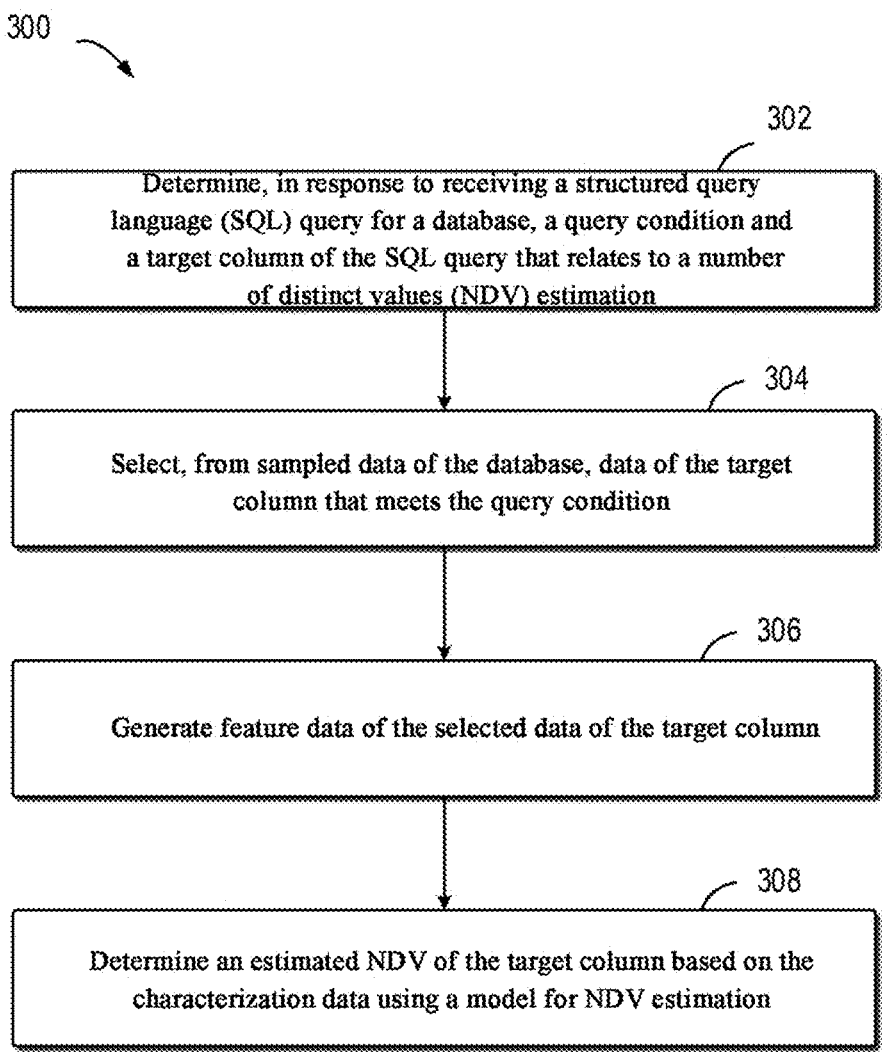

300

302

Determine, in response to receiving a structured query language (SQL) query for a database, a query condition and a target column of the SQL query that relates to a number of distinct values (NDV) estimation

304

Select, from sampled data of the database, data of the target column that meets the query condition

306

Generate feature data of the selected data of the target column

308

Determine an estimated NDV of the target column based on the characterization data using a model for NDV estimation

FIG. 3

METHOD, APPARATUS, ELECTRONIC DEVICE, AND MEDIUM FOR PROCESSING DATABASE QUERY

CROSS-REFERENCE TO RELATED APPLICATION(S)

This application claims priority to Chinese Application No. 202410022242.4 filed on Jan. 5, 2024, the disclosure of which is incorporated herein by reference in its entirety.

FIELD

The present disclosure relates to the field of computer technologies, and in particular, to a method, an apparatus, an electronic device, a computer-readable storage medium, and a computer program product for processing a database query.

BACKGROUND

When a user uses a large database system, aggregation analysis query operations can be frequently used. The so-called aggregation analysis query function generally uses aggregation functions to perform data operations. An aggregation function can use multiple data rows as inputs, perform specific calculations (for example, calculate an average value, a sum, a maximum value, a minimum value, and so on), and then return a single result. To process aggregation analysis queries, the database usually builds hash tables in memory. When processing an aggregation query, the database creates a hash table with a fixed capacity. If the created hash table's capacity is too small, the database needs to frequently adjust its capacity. If it is too large, it may cause memory overflow. To reduce the frequency of hash table adjustment, a method for accurately determining the hash table capacity is urgently needed in practice.

Generally, for a hash table, adding duplicate data can be avoided by using a unique key (that is, a distinct data value), so determining the hash table capacity actually means determining the number of distinct values (NDV) of data. Therefore, if the NDV value can be estimated quickly and accurately, it can avoid the increased overhead caused by the frequent adjustment of the hash table capacity by the database.

SUMMARY

In view of the above, the present disclosure provides a method, an apparatus, an electronic device, a computer-readable storage medium, and a computer program product for processing a database query.

In a first aspect of the present disclosure, there is provided a method for database query, comprising: determining, in response to receiving a structured query language (SQL) query for a database, a query condition and a target column of the SQL query that relates to a number of distinct values (NDV) estimation; selecting, from sampled data of the database, data of the target column that meets the query condition; generating feature data of the selected data of the target column; and determining an estimated NDV of the target column based on the feature data using a model for NDV estimation.

In a second aspect of the present disclosure, there is provided an apparatus for database query, comprising: an estimation condition determination unit configured to determine, in response to receiving a structured query language (SQL) query for a database, a query condition and a target column of the SQL query that relates to a number of distinct values (NDV) estimation; a data selection unit configured to select, from sampled data of the database, data of the target column that meets the query condition; a feature data generation unit configured to generate feature data of the selected data of the target column; and a result obtaining unit configured to determine an estimated NDV of the target column based on the feature data using a model for NDV estimation.

In a third aspect of the present disclosure, there is provided an electronic device, comprising one or more processors; and a storage apparatus for storing one or more programs, wherein the one or more programs, when executed by the one or more processors, cause the one or more processors to implement the method according to the first aspect of the present disclosure.

In a fourth aspect of the present disclosure, there is provided a computer-readable storage medium having a computer program stored thereon, wherein the program, when executed by a processor, causes the method according to the first aspect of the present disclosure to be implemented.

In a fifth aspect of the present disclosure, there is provided a computer program product, wherein the computer program, when executed by a processor, causes the method according to the first aspect of the present disclosure to be implemented.

It should be understood that the content described in this section is not intended to identify key or important features of embodiments of the present disclosure, nor is it intended to be used to limit the scope of the present disclosure. Other features of the present disclosure will become readily understandable through the following description.

BRIEF DESCRIPTION OF THE DRAWINGS

The above and other features, advantages, and aspects of embodiments of the present disclosure will become more apparent in conjunction with the drawings and with reference to the following detailed description. In the drawings, the same or similar reference numerals denote the same or similar elements, wherein:

FIG. 3 shows a schematic flowchart of a method for database query according to embodiments of the present disclosure;

DETAILED DESCRIPTION OF EMBODIMENTS

Figure 1:
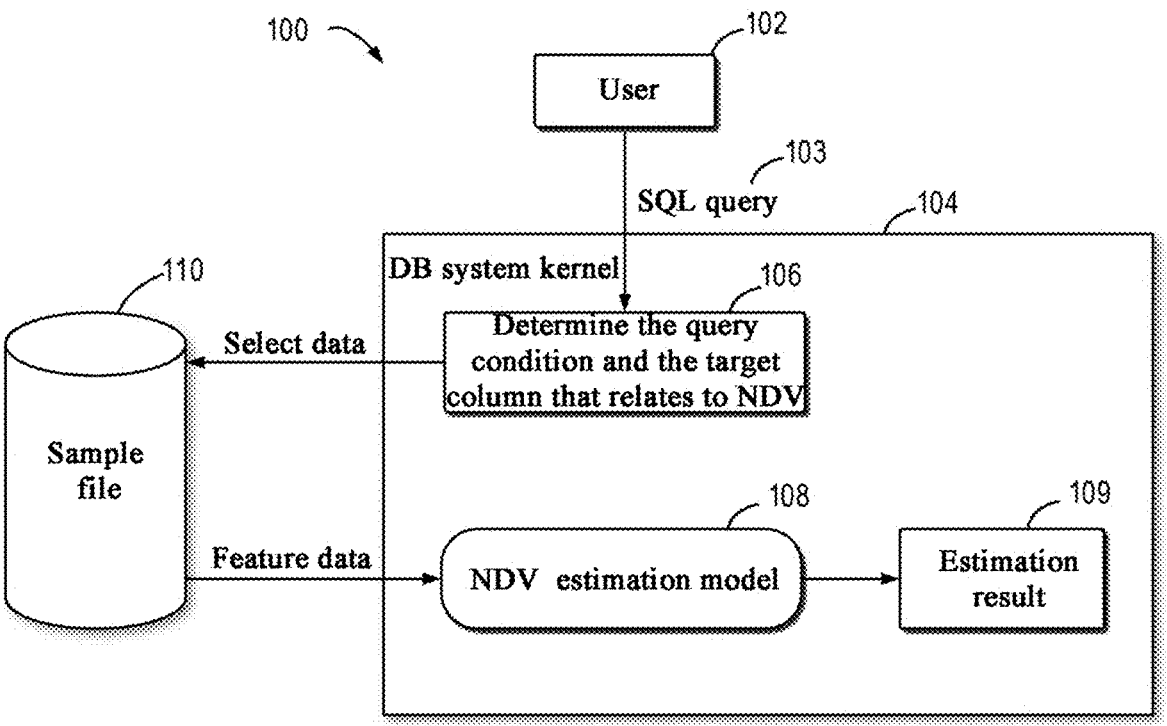
FIG. 1 shows a schematic block diagram of determining an estimated NDV based on a user SQL query according to embodiments of the present disclosure.

The following describes exemplary embodiments of the present disclosure with reference to the accompanying drawings, which include various details of the embodiments of the present disclosure to help understanding, and which should be considered as merely exemplary. Therefore, those of ordinary skill in the art should realize that various changes and modifications can be made to the embodiments described here without departing from the scope and spirit of the present disclosure. Similarly, for the sake of clarity and conciseness, the descriptions of well-known functions and structures are omitted below.

In the description of the embodiments of the present disclosure, the terms "include" and similar terms should be understood as open inclusion, that is, "include but not limited to". The term "based on" should be understood as "at least partially based on". The term "an embodiment" or "the embodiment" should be understood as "at least one embodiment". The terms "first", "second", and the like may refer to different or same objects. Other explicit and implicit definitions may also be included below.

As used herein, a "model" can learn an association between a corresponding input and an output from training data, so that after training, a corresponding output can be generated for a given input. The generation of the model may be based on machine learning techniques. Deep learning is a machine learning algorithm that processes inputs and provides corresponding outputs by using a plurality of layers of processing units. A neural network model is an example of a deep learning-based model. Herein, "model" may also be referred to as "machine learning model", "learning model", "machine learning network", or "learning network", which are used interchangeably herein.

"Neural network" is a deep learning-based machine learning network. The neural network can process an input and provide a corresponding output, and usually includes an input layer and an output layer, and one or more hidden layers between the input layer and the output layer. A neural network used in deep learning applications usually includes many hidden layers, thereby increasing the depth of the network. Layers of the neural network are connected in sequence, so that an output of a previous layer is provided as an input of a next layer, where the input layer receives an input of the neural network, and an output of the output layer is used as a final output of the neural network. Each layer of the neural network includes one or more nodes (also referred to as processing nodes or neurons), and each node processes an input from a previous layer.

Generally, machine learning can be roughly divided into three stages, namely, a training stage, a testing stage, and a use stage (also referred to as an inference stage). In the training stage, a given model can be trained using a large amount of training data, and parameter values are iteratively updated until the model can obtain consistent inference from the training data that meets an expected target. Through training, the model can be considered as being able to learn, from the training data, an association between an input and an output (also referred to as input-to-output mapping). The parameter values of the trained model are determined. In the testing stage, a test input is applied to the trained model to test whether the model can provide a correct output, so as to determine the performance of the model. In some implementations, the testing stage may be omitted. In the use stage, the model can be used to process an actual input based on the parameter values obtained through training, to determine a corresponding output.

An aggregation query refers to an operation that uses multiple data rows as inputs, performs specific calculations, and then returns a single result. The aggregation query is usually used to count and summarize data. For a user's aggregation query, the database usually builds a hash table in the memory for processing. When an aggregation query operation is performed, the database first creates a hash table with a fixed capacity to store a unique key. If the allocated hash table capacity is too small, as more and more unique keys are encountered during data processing, the hash table capacity may reach an upper limit or a specific threshold. In this case, the database system needs to readjust the hash table size. If the allocated hash table capacity is too large, the memory resources are wasted. Therefore, when a user performs an aggregation query, if the database system kernel can estimate the unique key and allocate a hash table with a suitable capacity, the likelihood of hash table capacity adjustment can be significantly reduced.

Generally, in order to avoid storing duplicate data, in practice, the number of distinct values (NDV) of columns in the database is estimated to save storage space. Therefore, allocating hash table capacity can be regarded as an NDV estimation problem. One of the objectives of the present disclosure is how to quickly estimate the NDV related to the user query, so as to allocate a hash table with a suitable capacity, while avoiding the performance degradation of the database system caused by the frequent adjustment of the hash table capacity by the database system kernel.

To this end, the present disclosure provides a method for database query. Specifically, first, a machine learning model for estimating NDV is deployed in a database system kernel to quickly and accurately estimate the NDV of the sampled data. At the same time, according to the specific column to be queried by the user, data of the column in the database is sampled in advance and stored in a sample file to avoid additional delays in data sampling during aggregation query. Then, the sampled data is selected for parallel featuring according to the target column and the query condition corresponding to the user SQL query. The feature data is inputted into the NDV estimation model to obtain the estimated NDV.

In this way, the NDV estimation can be quickly and accurately performed for the query condition of the user SQL query, so that the database system kernel can allocate a hash table with a suitable capacity during the aggregation query, thereby improving the performance of the aggregation query of the database system kernel. The embodiments of the present disclosure will be described below with reference to the accompanying drawings.

FIG. 1 shows a schematic block diagram of determining an estimated NDV based on a user SQL query according to embodiments of the present disclosure. It should be understood that the database system device 100 shown in FIG. 1 is only exemplary, and should not constitute any limitation on the functions and scope of implementation described in the present disclosure. It should be noted that although not explicitly shown in FIG. 1, the database system device 100 shown in FIG. 1 may include or run through a processing unit and a storage unit.

As shown in the figure, the database system device 100 includes a database system kernel 104 and a sample file 110. The database system kernel 104 receives a structured language (SQL) query from a user 102 and processes the query. If the processing of the query requires the NDV of the related column to be estimated (for example, an aggregation query), the target column and the related query condition corresponding to the SQL query 103 of the user 102 can be determined at 106.

After the related target column and the query condition 106 are determined, the database system kernel 104 sends a data selection instruction to the sample file 110. The data in the sample file 110 has been sampled in advance and stored outside the database system kernel 104. In some embodiments, the sample file 110 may be stored in a Hadoop Distributed File System (HDFS).

In addition to determining the target column and the query condition 106 related to the NDV, the processing unit may also deploy, in the database system kernel 104, a machine learning model 108 for estimating the NDV. In some embodiments, the NDV estimation model 108 uses a basic method of maximum likelihood estimation and is trained by introducing a supervised learning framework, so that more accurate NDV estimation results can be obtained in databases of various scales.

After the related target column and the query condition 106 are determined, the database system kernel 104 sends an instruction for selecting related data to the sample file 110, and then the database system kernel 104 performs characterization processing on the selected data to obtain corresponding feature data. After the corresponding feature data is obtained, the processing unit uses the NDV estimation model 108 to generate a related estimated NDV result 109 and stores the result in the storage unit.

Figure 2:
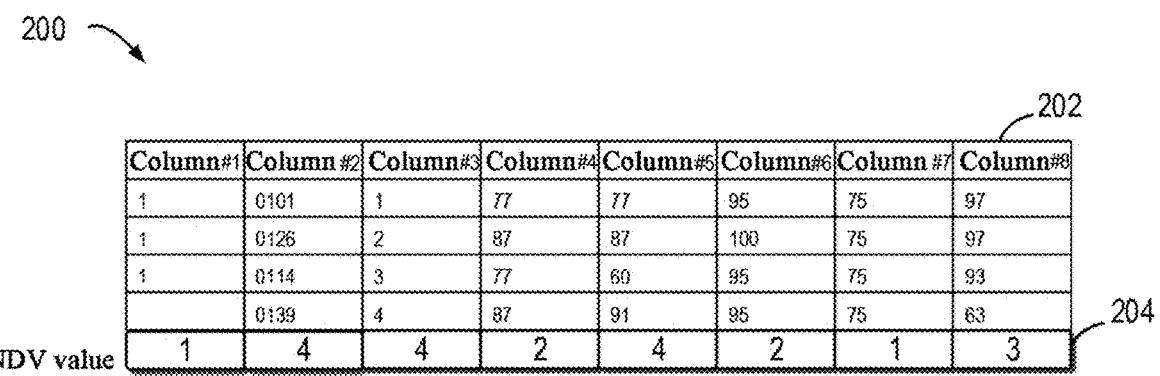
FIG. 2 shows a schematic diagram of calculating an actual value of the NDV of a column according to embodiments of the present disclosure.

FIG. 2 shows a schematic diagram of calculating an actual value of the NDV of a column according to embodiments of the present disclosure. It should be noted that the rows and columns of the database table shown in FIG. 2 and the values of the elements are merely schematic, and are only used for better understanding the calculation of the NDV value. In fact, the number of rows and columns of the database table and the values of the elements may be different.

As shown in FIG. 2, the data table 202 has a total of 8 columns and 4 rows, and the values in different rows and columns are not completely consistent. In the first column, the value of each row is 1 (that is, there is only one distinct value in the entire column), so the calculation result of the NDV value 204 is 1, which means that the number of distinct values in the first column is 1. In the second column, the values of each row are not consistent, so the calculation result of the NDV value 204 is 4. Similarly, the NDV values 204 of the third column and the fifth column are also 4. In the fourth column, there are a total of 2 groups of the same values, namely 77 and 87, so the NDV value 204 is 2.

The technical solution described above is only for example, rather than limiting the present disclosure. To explain the concept of the proposed solution more clearly, the method for database query will be described in more detail below with reference to FIG. 3.

FIG. 3 shows a schematic flowchart of a method for database query according to embodiments of the present disclosure. In some embodiments, the method 300 may be implemented by, for example, the database system kernel 104 shown in FIG. 1. It should be understood that the method 300 may further include additional actions not shown and/or may omit the shown actions, and the scope of the present disclosure is not limited in this respect.

At block 302, in response to receiving a structured query language (SQL) query for a database from a user 102, a query condition and a target column of the SQL query that relates to a number of distinct values (NDV) estimation are determined. SQL is a database language with various functions such as data manipulation and data definition. A user may generate an SQL query by using an SQL statement. For example, the user 102 may generate an SQL query "select count (distinct col #1) from table1 where col #2>val #2", and then the query condition corresponding to this SQL query is "col #2>val #2", and the NDV value of col #1 is estimated under this query condition. The database system kernel 104 determines a target column (for example, a column where col #1 is located) and a query condition (for example, col #2>val #2) to be aggregation queried according to the SQL query of the user 102.

At block 304, data of the target column that meets the query condition is selected from sampled data of the database. To avoid affecting the performance of the database aggregation query, the data can be sampled in advance by using a background task before the user generates the SQL query. The data range of the sampled data may include data of all columns in the database, or may include data of columns that may be used by the user SQL query, which is not limited here. In some embodiments, the time range of the sampled data may further include data in the most recent week, or may include data in the most recent month, and the data sampling range is not limited here. After the sampling is completed, the sampled data is stored in a sample file. In some embodiments, the sampled data may be stored in a Hadoop Distributed File System (HDFS).

According to the target column and the query condition determined at block 302, data that meets the target column and the query condition is selected from the sample file.

At block 306, feature data of the selected data of the target column is generated. In some embodiments, a featuring method may be used to sample data by constructing an internal SQL statement in the system kernel 104 in advance. It should be noted that the sampling using the internal SQL statement described here could be not consistent with the sampling described in block 304. The sampling here is further sampling based on the data of the target column that meets the query condition and that has been selected in block 304. Based on the sampled data, the database system kernel 104 may perform featuring process on the data. In some embodiments, the featuring process may also be performed using an SQL statement. Specifically, the number of distinct elements is calculated for the occurrence frequency of each data to obtain a feature vector Fi. For example, for data 4, 2, 4, 6, and 6 in the target column, the number of elements (2) that occur once is 1, and the number of elements (4) and (6) that occur twice is 2, then the feature vector Fi is (1, 2).

At block 308, an estimated NDV of the target column is determined based on the obtained feature data using a machine learning model for NDV estimation. In some embodiments, the NDV machine learning estimation model 108 may use a basic method of maximum likelihood estimation and be trained by introducing a supervised learning framework, so that more accurate NDV estimation results can be obtained in databases of various scales. In addition, the machine learning model for estimating the NDV can ensure a good estimation result even when the data sampling rate is low. In the offline training and inference process of the model, the machine learning model can consume less system resources. Optionally, the NDV machine learning estimation model can be applied to various workloads after being trained once. After the estimated NDV is obtained, the database system kernel 104 can allocate a hash table with a suitable capacity according to the estimated NDV.

Figure 4:
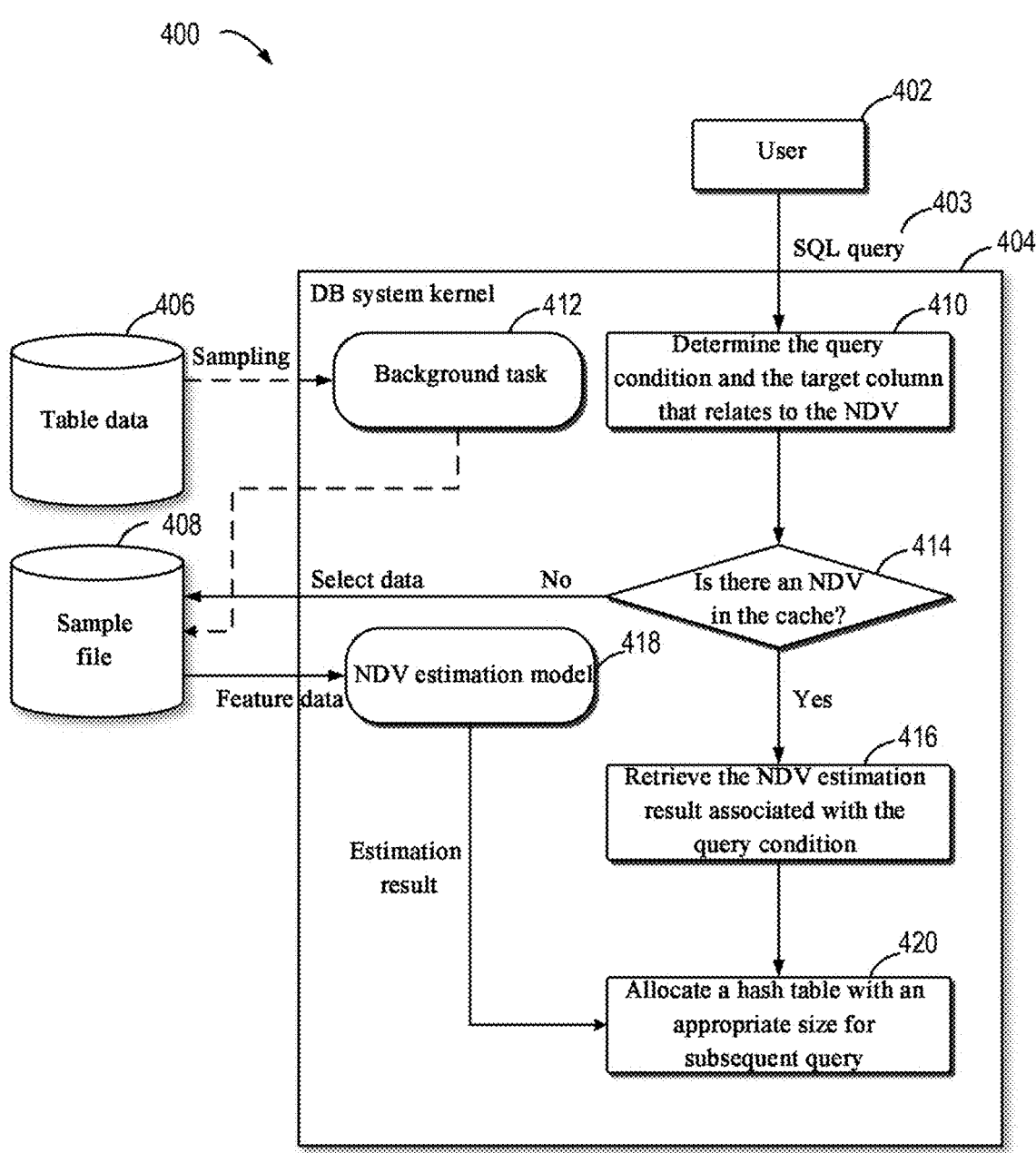
FIG. 4 shows a schematic block diagram of allocating a hash table based on a user SQL query according to embodiments of the present disclosure.

FIG. 4 shows a schematic block diagram of allocating a hash table based on a user SQL query according to embodiments of the present disclosure. In FIG. 4, the database system kernel 404 is an example implementation of the database system kernel 104 in FIG. 1.

As shown in FIG. 4, the user 402 first issues an SQL query 403. Correspondingly, when the NDV needs to be estimated, the database system kernel 404 can determine the target column and the query condition 410 related to the NDV corresponding to the SQL query.

In some embodiments, the database system kernel 404 can cache the query condition and the corresponding NDV corresponding to the historical SQL queries, so that the estimated NDV can be directly retrieved when the same query condition occurs. Specifically, at block 414, the database system kernel 404 can determine whether there is an NDV associated with the query condition in the cache, and if it is determined that the NDV has been stored, at block 416, the database system kernel 404 retrieves the NDV value associated with the query condition stored in the cache. After obtaining the estimated NDV value 416, the database system kernel 404 may allocate a hash table with an appropriate size at 420. By implementing the above cache mechanism, the number of times that the database system kernel 404 calls the model to estimate the NDV can be reduced, thereby reducing the computational overhead.

At block 414, if the database system kernel 404 determines that the NDV associated with the query condition is not stored in the cache, the machine learning model for estimating the NDV will be used to obtain the estimated NDV. In this case, the database system kernel 404 executes an instruction to select sampled data of a column corresponding to the query condition from a sample file 408 outside the kernel. In some embodiments, the sampled data in the sample file 408 is data that has been sampled by the database system kernel 404 using a background task 412 before the user SQL query instruction is issued and stored in a distributed file system 406. The background task 412 can avoid affecting the query performance of the database system kernel 404 due to real-time sampling by sampling in advance.

After the sampled data is selected from the sample file 408, the sampled data is characterized to generate the feature data. In some embodiments, the sampled data may be directly inputted into the machine learning model 418 for estimating the NDV to obtain the estimated NDV. In some embodiments, a plurality of pieces of data may be characterized in parallel. For example, a C++ Dataframe library may be used to perform parallel characterization on the sampled data. By using the C++ Dataframe library, the data can be processed simultaneously instead of being characterized in a streaming manner, thereby improving the query efficiency of the database system kernel.

The characterized data is inputted into the machine learning model 418 for estimating the NDV to obtain the estimated NDV. Then, the database system kernel 404 allocates a hash table 420 with an appropriate size according to the estimated NDV. In some embodiments, the estimated NDV and the query condition may be updated to the cache for subsequent use.

Figure 5:
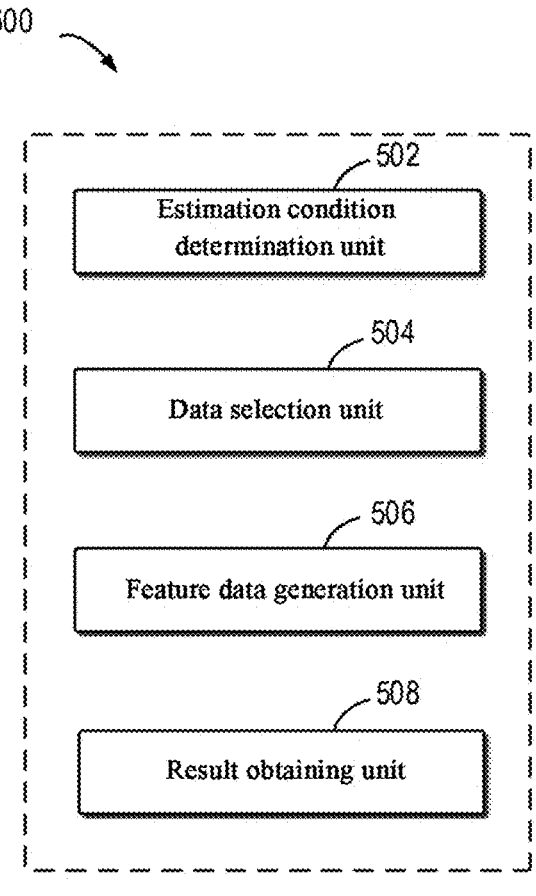
FIG. 5 shows a schematic block diagram of an apparatus for determining an estimated NDV based on a user SQL query according to embodiments of the present disclosure.

FIG. 5 shows a schematic block diagram of an apparatus for determining an estimated NDV based on a user SQL query according to embodiments of the present disclosure. The apparatus 500 may be implemented in, for example, the database system kernels 104 and 404 shown in FIG. 1 or FIG. 4. As shown in FIG. 5, the apparatus 500 includes: an estimation condition determination unit 502, a data selection unit 504, a feature data generation unit 506, and a result obtaining unit 508.

The estimation condition determination unit 502 may be configured to determine, in response to receiving a structured query language (SQL) query for a database, a query condition and a target column and of the SQL query that relate to a number of distinct values (NDV) estimation. The data selection unit 504 may be configured to select, from sampled data of the database, data of the target column that meets the query condition. The feature data generation unit 506 may be configured to generate feature data of the selected data of the target column. The result obtaining unit 508 may be configured to determine an estimated NDV of the target column based on the feature data using a model for NDV estimation.

It should be noted that more actions or steps described with reference to FIG. 1 to FIG. 4 may be implemented by the apparatus 500 shown in FIG. 5. For example, the apparatus 500 may include more modules or units to implement the actions or steps described above, or some units or modules shown in FIG. 5 may be further configured to implement the actions or steps described above. It will not be repeated here.

The exemplary embodiments of the present disclosure are described above with reference to FIG. 1 to FIG. 5. Compared with the existing solutions, the method for database query of the present disclosure can efficiently and accurately estimate the NDV of the target column. Specifically, the data of the column is sampled in advance and stored in a distributed file system. In response to the query condition corresponding to the user SQL query, the database system can quickly select data that meets the query condition and perform characterization processing. Parallel characterization of the sampled data can be realized by using the C++ Dataframe library, thereby reducing the data processing time. A more accurate NDV estimation is realized by inputting the characterized data into the machine learning model for estimating the NDV with high estimation accuracy, thereby realizing the allocation of a hash table with a suitable capacity.

In addition, the present disclosure also introduces a cache mechanism. By storing the target column and the query condition corresponding to the historical SQL queries of the user, when the query condition corresponding to the SQL query instruction made by the user matches the query condition stored in the cache, the estimated NDV associated with the query condition can be directly retrieved, thereby implementing quick determination of the NDV result, and thus quick allocation of the hash table capacity. Through the implementation of the above mechanism, the present disclosure applies the machine learning-based NDV estimation model, and can quickly and accurately obtain the estimated NDV, thereby improving the performance of the database aggregation query and reducing resource consumption.

Figure 6:
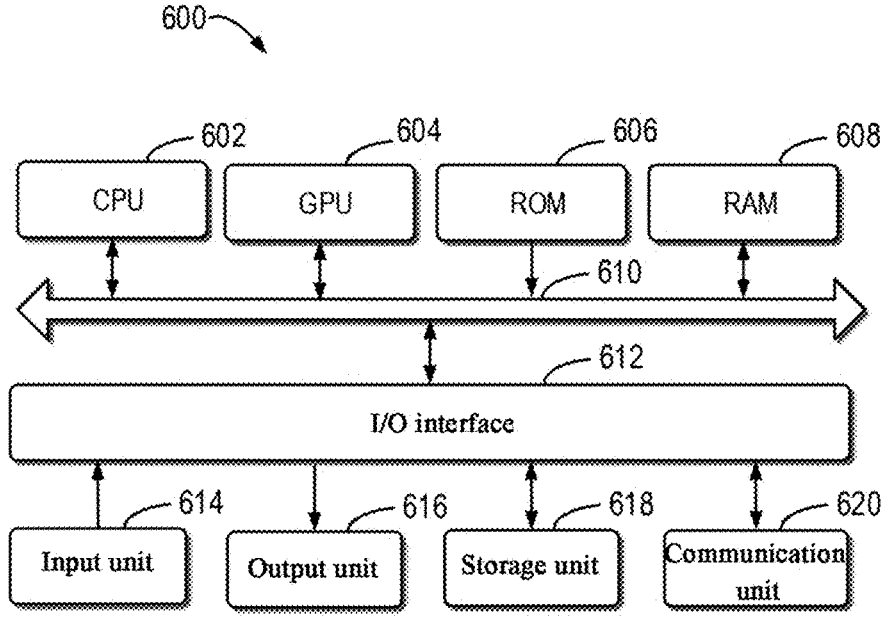
FIG. 6 shows a block diagram of an electronic device according to embodiments of the present disclosure.

FIG. 6 shows a block diagram of an electronic device 600 according to some embodiments of the present disclosure. The device 600 may be the device or apparatus described in the embodiments of the present disclosure. As shown in FIG. 6, the device 600 includes a central processing unit (CPU) 602 and a graphics processing unit (GPU) 604, which can perform various appropriate actions and processing according to computer program instructions stored in a read-only memory (ROM) 606 or computer program instructions loaded from a storage unit 618 into a random access memory (RAM) 608. In the RAM 608, various programs and data required for the operation of the device 600 may also be stored. The CPU 602, the GPU 604, the ROM 606, and the RAM 608 are connected to each other through a bus 610. An input/output (I/O) interface 612 is also connected to the bus 610. Although not shown in FIG. 6, the device 600 may further include a coprocessor.

A plurality of components in the device 600 are connected to the I/O interface 612, including: an input unit 614, such as a keyboard, a mouse, and the like; an output unit 616, such as various types of displays, speakers, and the like; the storage unit 618, such as a disk, an optical disk, and the like; and a communication unit 620, such as a network card, a modem, a wireless communication transceiver, and the like. The communication unit 620 allows the device 600 to exchange information/data with other devices via a computer network such as the Internet and/or various telecommunication networks.

The various methods or processes described above may be executed by the CPU 602 and the GPU 604. For example, in some embodiments, the method may be implemented as a computer software program, which is tangibly included in a machine-readable medium, such as the storage unit 618. In some embodiments, part or all of the computer program may be loaded and/or installed into the device 600 via the ROM 606 and/or the communication unit 620. When the computer program is loaded and executed by the CPU 602 and the GPU 604, one or more steps or actions in the methods or processes described above may be performed.

Various implementations of the systems and techniques described herein may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), computer hardware, firmware, software, and/or a combination thereof. These various implementations may include: being implemented in one or more computer programs, the one or more computer programs may be executed and/or interpreted on a programmable system including at least one programmable processor, the programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

Program codes for implementing the method of the present disclosure may be written in any combination of one or more programming languages. These program codes may be provided to a processor or controller of a general-purpose computer, a special-purpose computer, or other programmable data processing apparatus, such that when the program codes are executed by the processor or the controller, the functions/operations specified in the flowcharts and/or block diagrams are implemented. The program codes may be completely executed on a machine, partially executed on a machine, executed as a stand-alone software package partially on a machine, partially on a remote machine, or completely executed on a remote machine or server.

In the context of the present disclosure, the machine-readable medium may be a tangible medium that may contain or store a program for use by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

To provide interaction with a user, the systems and techniques described herein can be implemented on a computer, the computer having: a display apparatus (for example, a CRT (cathode ray tube) or LCD (liquid crystal display) monitor) for displaying information to the user; and a keyboard and a pointing apparatus (for example, a mouse or a trackball) through which the user can provide input to the computer. Other kinds of apparatuses can also be used to provide interaction with the user; for example, feedback provided to the user can be any form of sensory feedback (for example, visual feedback, auditory feedback, or tactile feedback); and input from the user can be received in any form (including acoustic input, voice input, or tactile input).

The systems and techniques described herein can be implemented in a computing system that includes a back-end component (for example, as a data server), or a computing system that includes a middleware component (for example, an application server), or a computing system that includes a front-end component (for example, a user computer with a graphical user interface or a web browser, through which the user can interact with implementations of the systems and techniques described herein), or a computing system that includes any combination of such back-end, middleware, or front-end components. The components of the system can be connected to each other by any form or medium of digital data communication (for example, a communication network). Examples of the communication network include: a local area network (LAN), a wide area network (WAN), and the Internet.

The computer system may include a client and a server. The client and the server are generally far away from each other and usually interact through a communication network. The relationship between the client and the server is generated by computer programs running on corresponding computers and having a client-server relationship with each other.

It should be understood that various forms of processes shown above can be used, and steps can be reordered, added, or deleted. For example, the steps described in the present disclosure may be performed in parallel, performed sequentially, or performed in a different order. As long as the desired results of the technical solutions disclosed in the present disclosure can be achieved, no limitation is made herein.

The above specific implementations do not constitute a limitation to the scope of protection of the present disclosure. Persons skilled in the art should understand that various modifications, combinations, sub-combinations, and substitutions may be made according to design requirements and other factors. Any modification, equivalent replacement, and improvement made within the spirit and principle of the present disclosure shall be included in the scope of protection of the present disclosure.

The invention claimed is:

1. A computer-implemented method implemented by a database system device for processing a database query, comprising:

receiving, by a database system kernel, a structured query language (SQL) query for a database, wherein the SQL query specifies a query condition and a target column related to number of distinct values (NDV) estimation, and the SQL query comprises an aggregation query for the target column;

selecting, by the database system kernel from sampled data of the database, data of the target column that satisfies the query condition;

generating, by the database system kernel, a feature vector based on the data of the target column selected from the sampled data, wherein each i-th component of the feature vector represents the number of distinct values that occur i times in the target column, wherein i is an integer;

determining, by the database system kernel, an estimated NDV of the target column of the database using a trained machine learning model for the NDV estimation and using the feature vector as an input to the trained machine learning model for the NDV estimation; and allocating, by the database system kernel, a hash table capacity based on the estimated NDV for the aggregation query.

2. The method of claim 1, further comprising, before the receiving the SQL query:

obtaining, by a background task of the database, the sampled data from at least one column of a table of the database, wherein the at least one column is a subset of columns of the table; and storing the sampled data as a sample file.

3. The method of claim 1, wherein generating the feature vector based on the data of the target column selected from the sampled data comprises:

generating the feature vector in parallel using a C++ Dataframe library.

4. The method of claim 1, further comprising:

storing, in a cache, the estimated NDV of the target column and the query condition in association as an estimation result.

5. The method of claim 4, wherein the SQL query is a first SQL query, and the method further comprises:

determining, in response to receiving a second SQL query, a query condition and a target column of the second SQL query that relates to an NDV estimation;

determining whether the cache stores an estimation result of the target column that matches the query condition of the second SQL query; and determining, in response to determining that there is a matched estimation result, the matched estimation result as the estimated NDV of the target column of the second SQL query.

6. An electronic device, comprising:

one or more processors; and a memory storing one or more programs, wherein the one or more programs, when executed by the one or more processors, cause the one or more processors to perform a method implemented by a database system device for processing a database query, the method comprising:

receiving, by a database system kernel, a structured query language (SQL) query for a database, wherein the SQL query specifies a query condition and a target column related to number of distinct values (NDV) estimation, and the SQL query comprises an aggregation query for the target column;

selecting, by the database system kernel from sampled data of the database, data of the target column that satisfies the query condition;

generating, by the database system kernel, a feature vector based on the data of the target column selected from the sampled data, wherein each i-th component of the feature vector represents the number of distinct values that occur i times in the target column, wherein i is an integer;

determining, by the database system kernel, an estimated NDV of the target column of the database using a trained machine learning model for the NDV estimation and using the feature vector as an input to the trained machine learning model for the NDV estimation; and allocating, by the database system kernel, a hash table capacity based on the estimated NDV for the aggregation query.

7. The electronic device of claim 6, wherein the method further comprises, before the receiving the SQL query:

obtaining, by a background task of the database, the sampled data from at least one column of a table of the database, wherein the at least one column is a subset of columns of the table; and storing the sampled data as a sample file.

8. The electronic device of claim 6, wherein generating the feature vector based on the data of the target column selected from the sampled data comprises:

generating the feature vector in parallel using a C++ Dataframe library.

9. The electronic device of claim 6, wherein the method further comprises, storing, in a cache, the estimated NDV of the target column and the query condition in association as an estimation result.

10. The electronic device of claim 9, wherein the SQL query is a first SQL query, and the method further comprises:

determining, in response to receiving a second SQL query, a query condition and a target column of the second SQL query that relates to an NDV estimation;

determining whether the cache stores an estimation result of the target column that matches the query condition of the second SQL query; and determining, in response to determining that there is a matched estimation result, the matched estimation result as the estimated NDV of the target column of the second SQL query.

11. A non-transitory computer-readable storage medium having a computer program stored thereon, wherein the program, when executed by a processor of a device, causes the device to perform a method implemented by a database system device for processing a database query, the method comprising:

receiving, by a database system kernel, a structured query language (SQL) query for a database, wherein the SQL query specifies a query condition and a target column related to number of distinct values (NDV) estimation, and the SQL query comprises an aggregation query for the target column;

selecting, by the database system kernel from sampled data of the database, data of the target column that satisfies the query condition;

generating, by the database system kernel, a feature vector based on the data of the target column selected from the sampled data, wherein each i-th component of the feature vector represents the number of distinct values that occur i times in the target column, wherein i is an integer;

determining, by the database system kernel, an estimated NDV of the target column of the database using a trained machine learning model for the NDV estimation and using the feature vector as an input to the trained machine learning model for the NDV estimation; and allocating, by the database system kernel, a hash table capacity based on the estimated NDV for the aggregation query.

12. The non-transitory computer-readable storage medium of claim 11, wherein the method further comprises, before the receiving the SQL query:

obtaining, by a background task of the database, the sampled data from at least one column of a table of the database, wherein the at least one column is a subset of columns of the table; and storing the sampled data as a sample file.

13. The non-transitory computer-readable storage medium of claim 11, wherein generating the feature vector based on the data of the target column selected from the sampled data comprises:

generating the feature vector in parallel using a C++ Dataframe library.

14. The non-transitory computer-readable storage medium of claim 11, wherein the method further comprises, storing, in a cache, the estimated NDV of the target column and the query condition in association as an estimation result.

15. The non-transitory computer-readable storage medium of claim 14, wherein the SQL query is a first SQL query, and the method further comprises:

determining, in response to receiving a second SQL query, a query condition and a target column of the second SQL query that relates to an NDV estimation;

determining whether the cache stores an estimation result of the target column that matches the query condition of the second SQL query; and determining, in response to determining that there is a matched estimation result, the matched estimation result as the estimated NDV of the target column of the second SQL query.

\* \* \* \* \*